Dec. 8, 1936.  E. T. TURNER  2,063,711

METHOD AND APPARATUS FOR CONDITIONING AIR

Filed March 22, 1934  2 Sheets-Sheet 2

INVENTOR.
EDWARD T. TURNER.
by
his ATTORNEY.

Patented Dec. 8, 1936

2,063,711

UNITED STATES PATENT OFFICE 2,063,711

METHOD AND APPARATUS FOR CONDITIONING AIR

Edward T. Turner, Dayton, Ohio

Application March 22, 1934, Serial No. 716,803

12 Claims. (Cl. 257—3)

This invention relates to a method and apparatus for conditioning air and is designed more particularly for maintaining the air in a room in substantially a predetermined condition, the term "room" being herein used to include any enclosure which is to be supplied with conditioned air.

One object of the invention is to provide a method for conditioning air whereby the air in the room will be maintained at the proper dry bulb temperature and humidity and will be provided with a supply of fresh air.

A further object of the invention is to provide such a method in which the fresh air will be washed before it is delivered to the room.

A further object of the invention is to provide such a method whereby the temperature throughout the room will be substantially equalized so that there will be little difference between the temperatures of the incoming and outgoing air.

A further object of the invention is to provide such a method which will maintain a circulation of air within the room, and which will prevent the formation of moisture on the windows.

A further object of the invention is to provide a simple efficient apparatus for carrying out the method.

A further object of the invention is to provide such an apparatus which will operate automatically throughout the year regardless of changes in outside weather conditions.

A further object of the invention is to provide such an apparatus which may be connected with a previously installed furnace system and the furnace utilized to heat the air before it is delivered to the room.

A further object of the invention is to provide such an apparatus which can be manufactured, installed and operated at a low cost.

Other objects of the invention will appear as the method and apparatus are described in detail.

Figure 1:
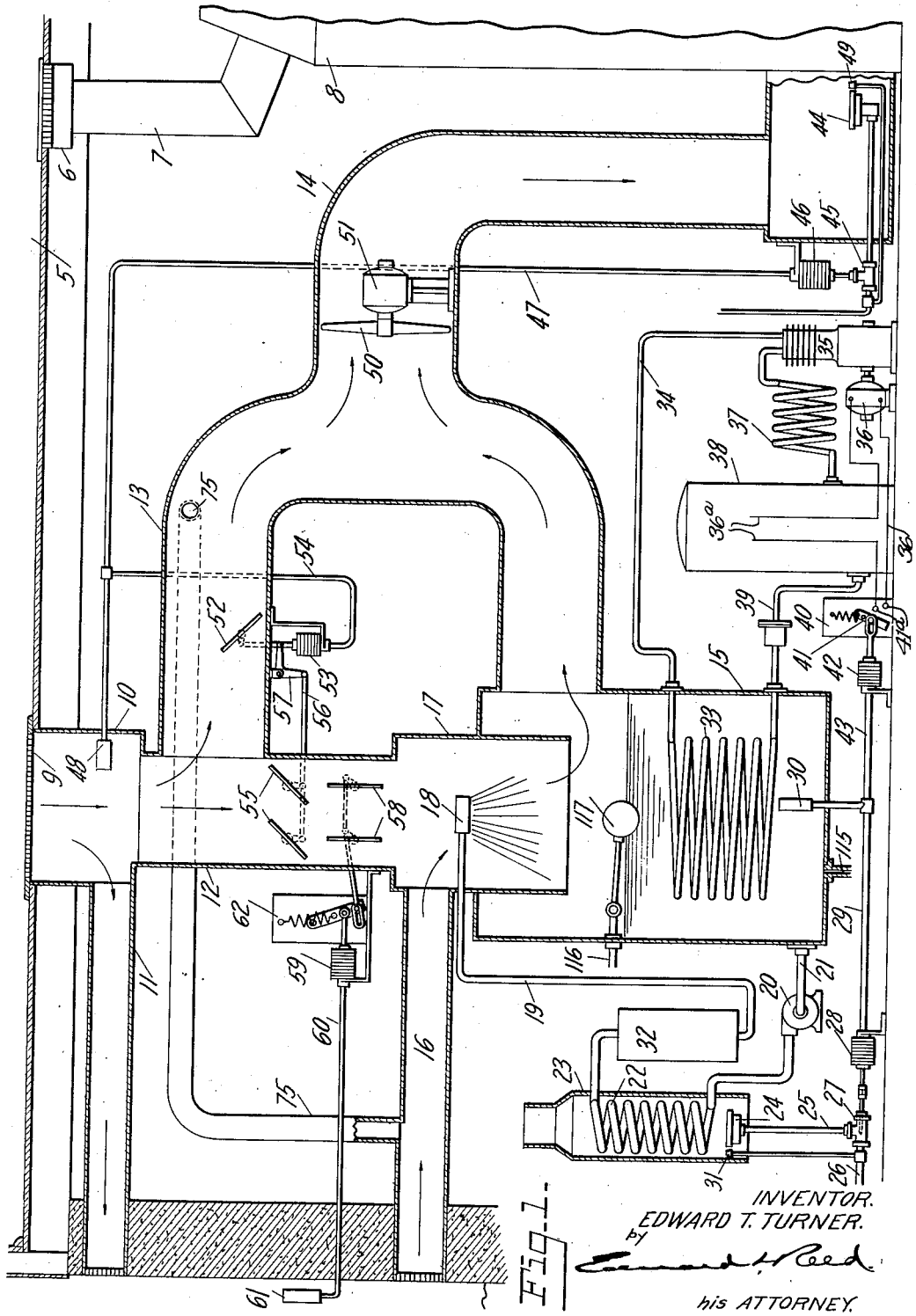
Figure 2:
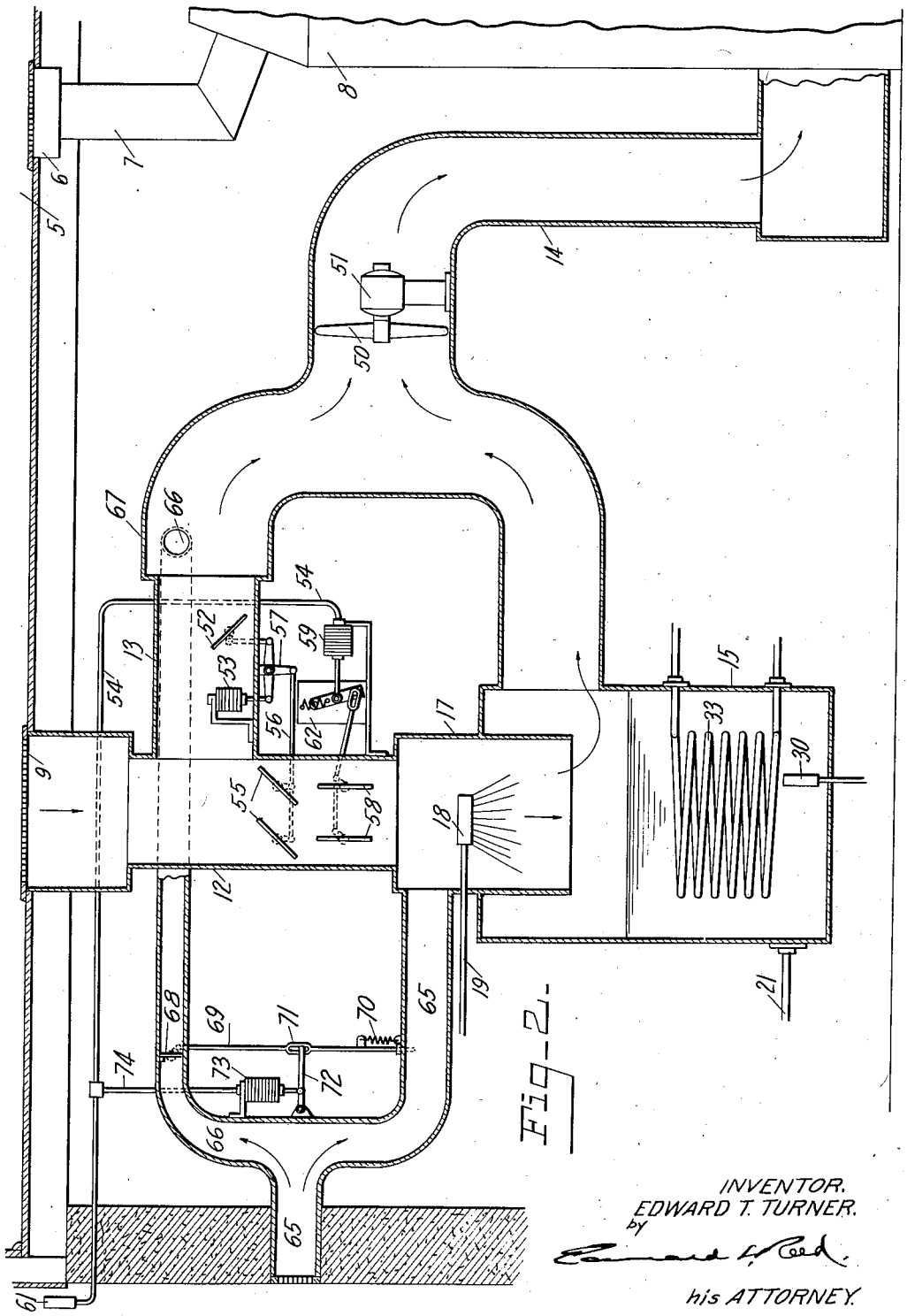

In the accompanying drawings Fig. 1 is a sectional view of an air conditioning apparatus embodying my invention, showing a furnace partially broken away; and Fig. 2 is a sectional view of a slightly modified form of the apparatus.

In carrying out my invention I provide means whereby air is caused to be constantly discharged from the room and a portion of that air discharged to waste, that is, to the exterior atmosphere. Another part of the discharged air is returned to the room but before being delivered to the room it is mixed with fresh air a part of which, at least, has been humidified or saturated at a predetermined dew point temperature, as by passing the same through a spray of water. Under some conditions a portion of the discharged air which is to be mixed with fresh air and returned to the room is subjected to the humidifying medium to impart thereto the desired dew point temperature. The volumes of the discharged air which is subjected to the humidifying medium and of the discharged air which is by-passed about the humidifying medium are automatically controlled in accordance with the dry bulb temperature of the room air, and the supply of discharged air to the humidifying medium may be automatically interrupted when the exterior air falls below a predetermined temperature, so that none of the room air will then be modified prior to its mixture with fresh air. Circulation of air through the apparatus and the room may be maintained by any suitable device, such as a fan, and the humidifying medium is maintained substantially constant in volume and in temperature, so that the air passing through the same will be saturated at a predetermined dew point temperature, for example at fifty degrees F. The air which has passed through the humidifying medium, which may be either fresh air alone or a mixture of fresh air and room air, is mixed with the room air which has been by-passed about the humidifying medium and this mixture is delivered to the room, additional heat being supplied thereto, when desirable, prior to its delivery.

Any suitable form of apparatus may be provided for carrying out the method but that here shown is simple and inexpensive in its construction and operation. The apparatus is shown as installed in the basement of a house, the floor of a room which is to be supplied with the conditioned air being shown at 5. This room is provided with an inlet for conditioned air, here shown in the form of a hot air register 6 which is connected by an air duct 7 with a hot air furnace 8. The room is also provided with an outlet for used air which is shown at 9 and is connected with a discharge conduit 10. A portion of the air discharged from the room is discharged to waste, that is, to the outside atmosphere. This waste air may escape from the room through any outlet but, in the present arrangement, a portion, at least, of the waste air is taken from the conduit 10 just below the floor and discharged through a waste condut 11, the conduit 10 being of reduced capacity below the conduit 11, as shown at 12, to facilitate the discharge of a portion of the air to waste. Leading from the reduced portion of the discharge conduit is a branch conduit 13 through which a second portion of the room air is delivered to a main conduit 14 which is connected, either directly or indirectly, with the inlet for the room. The discharged room air which is delivered to the conduit 14 is mixed therein with a volume of fresh air, which preferably is substantially equal to the volume of room air which has been discharged to waste, a part, at least, of this fresh air having been subjected to the action of moisture to impart thereto a predetermined dew point temperature substantially equal to the desired dew point temperature of the air which is to be delivered to the room, and when this air is mixed with the room air in the conduit 14 its dry bulb temperature is raised. Means are provided for subjecting a portion of the discharged room air to moisture to cool the same and this air is then delivered to the conduit 14 along with the room air from the conduit 13 and the fresh air. Preferably that portion of the discharged air which is to be cooled is mixed with the fresh air and the mixture subjected to moisture to impart thereto the desired dew point temperature. The apparatus in which the air is subjected to moisture for the purpose of imparting thereto a predetermined dew point temperature is herein called a humidifier but it will be understood that it may either increase or decrease the moisture content of the incoming air. A larger quantity of water is required to saturate air at a high temperature than is required to saturate the same at a low temperature. Consequently when the outside air is at a high temperature and substantially saturated it may contain moisture in excess of that required to saturate the air at the lower temperature at which it leaves the humidifier and under such circumstances a portion of the moisture in the incoming air may be condensed and left in the receptacle 15. On the other hand, if the outside air is cold and dry additional moisture will be added thereto by the humidifier, but the humidifying water is maintained substantially constant in volume and in temperature so that all the air discharged from the humidifier is saturated at the desired temperature. Therefore the term "humidifier" as herein used is intended to include any device in which air is subjected to moisture for the purpose of imparting thereto a desired dew point temperature, and the term "humidified air" is used to indicate air to which the desired dew point temperature has been imparted.

As here shown, the humidifier comprises a liquid receptacle 15 and the discharge conduit 10 extends into that receptacle, preferably through the top thereof. A fresh air conduit 16 leads from the exterior of the building into the discharge conduit just above the receptacle 15, the lower portion of the discharge conduit being enlarged, as shown at 17, to accommodate both a portion of the discharged room air and the fresh air. Mounted in this enlarged portion of the discharged conduit, below the fresh air conduit 16 is a spray head 18 arranged to discharge a spray of water or other humidifying liquid downwardly into the receptacle 15, the spray head being of such a character that the spray will substantially fill the cross section of the discharge conduit, so that all air passing through the discharge conduit into the container 15 will contact with the liquid spray. I prefer to use water as the humidifying medium but any suitable liquid may be employed and the term "water" as herein used is intended to include any liquid suitable for the purpose.

Water may be supplied to the spray head 18 from any suitable source but I prefer to use the same water over and over again as in this manner the quantity of water required is reduced to a minimum, thereby avoiding the excessive cost of humidifying and cooling water which is common to many types of air conditioning apparatus. As here shown, the spray head is connected by a pipe 19 with a rotary pump 20 which in turn is connected by a pipe 21 with the lower part of the receptacle 15. The pump may be operated by any suitable means, such as a small electric motor, not here shown, and causes the water to circulate through the receptacle and spray head.

In order to maintain the humidifying water at a constant temperature throughout all seasons of the year regardless of exterior temperature conditions, I have provided automatically controlled means for either heating or cooling the same as may be necessary. In the present construction a heater is interposed in the pipe 19 leading from the receptacle to the spray head and comprises a coil of pipe 22 arranged within a housing 23 above a gas burner 24. This burner is connected by a pipe 25 with a gas supply pipe 26 and the flow of gas to the burner is controlled by a valve 27 which is actuated by a temperature controlled device, such as an expansible bellows 28 of a well known type. This bellows is connected by a conduit 29 with a fluid bulb 30 arranged within the receptacle 15, so that the expansion of the fluid in the bulb 30, conduit 29 and bellows 28 will cause the latter to expand and close the valve 27. When the temperature of the water in the receptacle falls the contraction of the bellows will open the valve. A pilot burner 31 is connected with the gas supply line 26 in advance of the valve 27 so that when the valve is opened the gas will be automatically ignited at the burner. I have in the present installation also interposed a filter 32 in the connection between the tank and the spray head to remove solid matter from the water. For the purpose of cooling the water when necessary I have arranged a cooling coil 33 in the lower portion of the receptacle 15 where it will be immersed in the water and have connected this coil with a refrigerating apparatus. This refrigerating apparatus may be of any suitable character but, as here shown, the coil 33 is connected by a pipe 34 with a compressor 35 which is operated by an electric motor 36 and is connected through a condenser coil 37 with a receiver tank 38, which in turn is connected by a pipe 39, having an expansion valve, with the cooling coil 33. The motor for the compressor is connected with a source of electric current by conductors 36a and is controlled by an automatic switch 40 interposed in one of said conductors and comprising a movable member 41 and fixed contacts 41a arranged to be bridged by the movable member. The movable member 41 is connected with a temperature controlled device, such as a bellows 42, this bellows being in the present instance connected by a pipe 43 with the fluid bulb 30 in the receptacle 15. The switch 40 is of the snap action type so that it will be quickly opened and closed. It will be apparent therefore that when the temperature of the water in the humidifier rises above or falls below the predetermined temperature the cooling apparatus or the heating apparatus will automatically operate to restore the temperature to the desired level. The temperature at which the gas valve 27 will open is slightly lower than the temperature at which the switch 40 of the cooling apparatus will open, so that there will be no danger of both the heating apparatus and refrigerating apparatus operating at the same time. Ordinarily the refrigerating apparatus will operate only during warm weather and the heating apparatus will operate only during cool weather, but there may be times when both will operate at more or less frequent intervals, as for example when the nights are cold and the days warm. While the filter 32 will keep the water fairly clean, it is desirable that it should be renewed occasionally and I have provided means for causing a slow but continuous change of the water. For this purpose the receptacle 15 is provided in its bottom with an outlet having a restricted orifice 115 through which the water will flow constantly but in small quantities. Fresh water is delivered to the receptacle by a supply pipe 116 which is controlled by a float valve 117 to maintain the water in the receptacle at a substantially constant level.

The mixture of air which has been delivered to the main conduit 14 is fully conditioned with the exception that at times it may be desirable to raise the same to a higher temperature. The conduit may be connected with a heater of any suitable kind, such as the hot air furnace here shown, and when that furnace is in operation the conditioned air will be further heated before it is delivered to the room. However, during periods of moderate temperature when it is not desirable to operate the furnace there may be times when additional heat is desirable and I have therefore provided an auxiliary heater which is here shown as a gas burner 44 located in the conduit 14 near the point where it joins with the furnace. This burner is automatically controlled by a valve 45 which is actuated by an expansible element or bellows 46, this bellows being connected by a conduit 47 with a fluid bulb 48 which is so arranged that it will be subjected to the temperature of the room air. In the present instance, it is located in the discharge conduit 59 below the room outlet 9. The heater is, of course, provided with a pilot burner 49 and when the room air falls below a predetermined temperature the bellows 46 will contract to open the valve 45, thereby setting the auxiliary heater in operation. The burner is located directly in the conduit but the products of combustion from the burner will be so small in comparison with the fresh air that they will not be objectionable. The circulation of air through the several conduits and through the room may be maintained in any suitable manner, as by means of a fan 50 arranged within the main conduit 14 and driven by an electric motor 51.

The volume of discharged room air which is delivered directly to the conduit 14 and the volume of room air which is delivered to the humidifier are automatically controlled according to the dry bulb temperature of the room air. In the present arrangement a damper 52 is mounted in the branch conduit 13 leading from the discharge conduit to the main conduit 14 and this damper is actuated by an expansible device, or bellows, 53, which is connected by a tube 54 with the fluid bulb 48, which forms a part of the control for the auxiliary heater. The arrangement is such that as the temperature of the room air rises the damper will be moved toward its closed position, thus reducing the volume of the discharged room air which is mixed with the humidified air. Under such conditions it may be desirable to saturate and cool a larger volume of the discharged room air than would otherwise be necessary and I have therefore provided means for increasing the flow of room air through the humidifier as the flow of room air through the conduit 13 is restricted. This controlling device may conveniently comprise a damper or dampers located in the restricted portion of the discharge conduit 10 beyond the branch conduit 13, and I have here shown two such dampers, 55, which operate in unison. These dampers are connected by a rod 56 with a bell crank 57 which is connected with the bellows 53 which controls the damper 52, the arrangement being such that as the damper 52 is moved toward its fully open position the dampers 55 will be moved toward their closed positions, and vice versa. Thus when the room temperature is such that it is desirable to restrict the by-passing of room air about the humidifier there is an increased flow of room air through the humidifier, thereby cooling a larger portion of the room air which is mixed with the fresh air. On the other hand when the damper 52 is in a position to permit of the maximum flow of room air through the conduit 13 the delivery of room air to the humidifier is restricted or entirely interrupted, thus avoiding the unnecessary cooling and then reheating of that air. The controlling devices for the damper 52 and for the auxiliary heater 44 are so adjusted that the valve 45 for the auxiliary heater will not be opened until there is a maximum flow of dry room air through the conduit 13 and a minimum flow, or no flow at all, of room air through the humidifier, thus again avoiding the unnecessary cooling of the room air and then reheating the same. It will be noted that the damper 52 is of such a width that when in its fully closed position it will only partially obstruct the flow of air through the conduit 13, but preferably the dampers 55 are of such a character that they may completely interrupt the flow of room air through the discharge conduit to the humidifier.

It is also desirable to provide means for cutting off the flow of discharged room air to the humidifier when the outside air is below a predetermined temperature, say 70 degrees. When the room temperature is relatively high the dampers 55 will be open and air will be flowing through the discharge conduit to the humidifier and if the outside air is cold it is unnecessary to cool and reheat the old room air. Therefore I have interposed in the discharge conduit 10, below the dampers 55, a second controlling device which also comprises two dampers 58 which are actuated by an expansible device or bellows 59 connected by a tube 60 with a dry bulb 61 arranged outside of the building. When the outside air falls below the predetermined temperature the dampers 58 will be closed and when it rises above the said predetermined temperature said dampers will be opened. Preferably the dampers 58 are either entirely open or entirely closed and I have therefore interposed between the bellows 59 and the dampers 58 a snap action device 62 of a known type which will quickly move the dampers from either position to the other position, when the bellows has expanded or contracted to a predetermined extent.

In Fig. 2 I have shown an installation somewhat similar to that shown in Fig. 1 with the exception that I have provided means whereby a portion of the fresh air may be by-passed about the humidifier, and the volume of the fresh air which is so by-passed may, if desired, be automatically controlled according to the dry bulb temperature of the outside air. To this end the fresh air inlet 65 leads to the humidifier as above described but is provided with a branch 66, of somewhat smaller capacity, which leads to the branch conduit 13 where it is mixed with the dry room air, the conduit 13 being enlarged, as shown at 67, to permit this portion of fresh air to enter the same without reducing the volume of room air going through the conduit. By thus by-passing a quantity of untreated fresh air to the main conduit the dew point temperature of the air delivered to the room will be increased or decreased as the moisture content of the exterior air varies. In the installation illustrated the volume of the fresh air is automatically controlled and for that purpose I have mounted in the branch 66 of the fresh air conduit a damper 68 which is actuated by a rod 69, which in turn is acted upon by a spring 70 to hold the damper normally in its closed position. The rod 69 is connected, by a pin and slot connection 71, with a lever 72 which is actuated by a bellows 73 which in turn is connected by a tube 74 with the exterior fluid bulb 61, the arrangement being such that as the outside temperature falls the bellows 73 will contract and open the damper 68, thus permitting the portion of the fresh air to be by-passed about the humidifier and then mixed with the humidified air. If it is desired to by-pass a constant volume of fresh air about the humidifier this may be accomplished by providing an uncontrolled conduit leading from the fresh air inlet about the humidifier, as shown at 75 in Fig. 1.

While I have shown and described one embodiment of my invention, together with a minor modification thereof, I wish it to be understood that I do not desire to be limited to the details thereof as various modifications may occur to a person skilled in the art.

Having now fully described my invention what I claim as new and desire to secure by Letters Patent, is:

1. In an apparatus for supplying conditioned air to a room, a main heater to deliver heated air to said room, a main air conduit leading to said heater, a humidifier connected with said main conduit, a discharge conduit leading from said room to said humidifier, means to by-pass a portion of the room air about said humidifier to said main conduit, a fresh air conduit leading to said humidifier, temperature controlled means to control the volume of the room air which is by-passed about the said humidifier, an auxiliary heater arranged to heat the air which has been delivered to said main conduit, and means controlled by the dry bulb temperature of the room air to control the operation of said auxiliary heater.

2. A method of maintaining the air in a room in substantially a predetermined condition which comprises passing fresh air through a spray of water to wash and saturate the same at a predetermined dew point temperature, the supply of fresh air being substantially constant under all conditions of operation, causing air which has been discharged from said room to pass through said spray with said fresh air when the exterior air is above a predetermined dry bulb temperature, controlling the quantity of discharged room air passed through said spray in accordance with the dry bulb temperature of the room air, interrupting the passage of discharged room air through said spray when the exterior air falls below said predetermined dry bulb temperature, maintaining the spray water at substantially a predetermined temperature regardless of the temperature of the air delivered to said spray, and delivering to said room the air which has passed through said spray.

3. A method of maintaining the air in a room in substantially a predetermined condition which comprises passing fresh air through a spray of water to wash and saturate the same at a predetermined dew point temperature, causing air which has been discharged from said room to pass through said spray with said fresh air, passing other air which has been discharged from said room about said spray and mixing the same with the air which has been passed through said spray, controlling the proportions of discharged room air which is passed through said spray and which is passed about said spray in accordance with the dry bulb temperature of said room, interrupting the passage of discharged room air through said spray when the exterior air is below a predetermined dry bulb temperature, and delivering the mixture of air to said room.

4. In an apparatus for supplying conditioned air to a room, a humidifier, a main conduit leading from said humidifier to said room, means for supplying a constant quantity of fresh air to said humidifier under all operating conditions, a conduit to deliver discharged room air to said humidifier, means controlled by the dry bulb temperature of the room air for regulating the quantity of discharged room air delivered to said humidifier, means controlled by the dry bulb temperature of the exterior air to interrupt the supply of discharged room air to said humidifier when the exterior air is below a predetermined dry bulb temperature, and means for maintaining a circulation of air through said conduits and said humidifier.

5. In an apparatus for supplying conditioned air to a room, a humidifier, a discharge conduit leading from said room to said humidifier, a main conduit leading from said humidifier to said room, means for by-passing a portion of the room air about said humidifier and mixing the same with air which has been passed through said humidifier, a fresh air conduit leading to said humidifier, means controlled by the dry bulb temperature of the room air to determine the ratio of the room air passed through said humidifier to the room air which is by-passed about said humidifier, and means controlled by the dry bulb temperature of the exterior air to control the delivery of room air to said humidifier.

6. In an apparatus for supplying conditioned air to a room, a humidifier, a discharge conduit leading from said room to said humidifier, a main conduit leading from said humidifier to said room, means for by-passing a portion of the room air about said humidifier and mixing the same with air which has been passed through said humidifier, means controlled by the dry bulb temperature of the room air to determine the ratio of the room air passed through said humidifier to the air by-passed about said humidifier, conduits to respectively deliver fresh air to said humidifier and to said main conduit, and means controlled by the dry bulb temperature of the exterior air to determine the proportions of fresh air passing through the last mentioned conduits.

7. In an apparatus for supplying conditioned air to a room, a main conduit for delivering conditioned air to said room, a humidifier connected with said main conduit, means for recirculating water through said humidifier, means for passing through said humidifier a volume of fresh air which is constant under all conditions of operation, means for passing through said humidifier air which has been discharged from said room, means controlled by the dry bulb temperature of the exterior air for interrupting the passage of discharged room air through said humidifier when the exterior air is below a predetermined dry bulb temperature, and means controlled by the temperature of said water for maintaining the same at a substantially constant temperature.

8. In an apparatus for supplying conditioned air to a room, a humidifier, a main conduit leading from said humidifier to said room, means for supplying a constant quantity of fresh air to said humidifier under all operating conditions, a conduit to deliver discharged room air to said humidifier, means controlled by the dry bulb temperature of the room air for regulating the quantity of discharged room air delivered to said humidifier, means for maintaining a circulation of air through said conduits and said humidifier, means for circulating water through said humidifier, means for heating said water, means for cooling said water, and means controlled by the temperature of said water to control the operation of said heating means and said cooling means.

9. In an apparatus for supplying conditioned air to a room, a main heater to deliver heated air to said room, a main air conduit leading to said heater, a humidifier connected with said main conduit, means for passing fresh air and air which has been discharged from said room through said humidifier to said main conduit, an auxiliary heater arranged to heat the air which has been delivered to said main conduit, and means controlled by the dry bulb temperature of the room air to control the operation of said auxiliary heater.

10. In an apparatus for supplying conditioned air to a room, a main heater to deliver heated air to said room, a main air conduit leading to said heater, a humidifier connected with said main conduit, means for passing fresh air and air which has been discharged from said room through said humidifier to said main conduit, an auxiliary heater arranged to heat the air which has been delivered to said main conduit, and means controlled by the dry bulb temperature of the room air to control the volume of discharged room air which is passed through said humidifier and to control the operation of said auxiliary heater.

11. The method of lowering the dew point temperature of the air in a room as the dry bulb temperature of the exterior air falls which comprises subjecting a quantity of air to the action of a humidifying medium, by-passing exterior air about said humidifying medium when the exterior air falls below a predetermined dry bulb temperature and mixing the air so by-passed with the humidified air, increasing the quantity of exterior air so bypassed as the dry bulb temperature of the exterior air falls, and delivering the mixture of air to said room.

12. In an apparatus for supplying conditioned air to a room, a humidifier, a conduit leading from said humidifier to said room, means for passing a quantity of exterior air through said humidifier to said conduit, means for by-passing a second quantity of exterior air about said humidifier to said conduit, and means controlled solely by the dry bulb temperature of the exterior air to increase the quantity of exterior air so by-passed as the dry bulb temperature of the exterior air falls and to decrease the quantity of by-passed exterior air as the dry bulb temperature of the exterior air rises.

EDWARD T. TURNER.